United States Patent [19]

Mizuta

[11] Patent Number: 4,709,196
[45] Date of Patent: Nov. 24, 1987

[54] POWER WINDOW DEVICE WITH SAFETY DETECTOR AND CONTROL OVERRIDE

[75] Inventor: Ken Mizuta, Miyagi, Japan

[73] Assignee: Alps Electric Co., Ltd., Japan

[21] Appl. No.: 902,472

[22] Filed: Aug. 29, 1986

[30] Foreign Application Priority Data

Sep. 4, 1985 [JP] Japan ................................ 60-135812

[51] Int. Cl.⁴ .............................................. H02P 1/22
[52] U.S. Cl. .................................... 318/282; 318/266; 318/467; 318/469
[58] Field of Search ............... 318/256, 264, 265, 266, 318/280, 282, 286, 287, 466, 468, 469, 470, 284; 49/26, 28

[56] References Cited

U.S. PATENT DOCUMENTS

| 4,220,900 | 9/1980 | Mintz | 318/266 |
| 4,373,149 | 2/1983 | Coste | 318/256 X |
| 4,468,596 | 8/1984 | Kinzl et al. | 318/287 |
| 4,514,670 | 4/1985 | Fassel et al. | 318/266 X |
| 4,533,901 | 8/1985 | Lederle | 49/28 X |
| 4,563,623 | 1/1986 | Matsuka | 318/311 |
| 4,628,234 | 12/1986 | Mizuta | 318/264 X |
| 4,641,067 | 2/1987 | Iizawa et al. | 49/28 X |

Primary Examiner—William M. Shoop, Jr.
Assistant Examiner—Bentsu Ro
Attorney, Agent, or Firm—Guy W. Shoup

[57] ABSTRACT

A power window device has an arrangement to automatically invert the movement direction of a windowpane when an upward movement of the windowpane is prevented in the automatic drive mode by some reason before it reaches its proper upper limit, and also has an arrangement activated to invalidate the automatic inverting function of the arrangement for a predetermined time.

8 Claims, 7 Drawing Figures

POWER WINDOW DEVICE WITH SAFETY DETECTOR AND CONTROL OVERRIDE

FIELD OF THE INVENTION

This invention relates to a power window device, and more particularly to an improved power window arrangement adapted to interrupt a closing movement of a car windowpane on detection of a solid body or matter sandwiched between the windowpane and an opposed margin of the window frame.

BACKGROUND OF THE INVENTION

In conventional cars, a windowpane is moved up and down by manually rotating a handle. In more automated cars, however, an arrangement called "power window device" is employed to automatically move a windowpane up and down.

One arrangement of these automatic windowpane devices includes a drive motor rotatable in two opposite directions, a switch for changing the motor rotation for upward or downward movement of a windowpane, and two pairs of monostable multivibrator circuits. The multivibrator circuits produce a trigger pulse to drive the motor for a time to effect upward or downward movement of the windowpane.

The time for activating the motor is fixed in the aforegoing windowpane device regardless of where the windowpane is positioned before it is driven. Therefore, if the windowpane is moved up or down from a half-opened position, the motor continues its rotation also after the windowpane has reached its upper or lower limit. This apparently increases the load to the motor. If this use is often repeated, the life of the motor is significantly reduced.

Also when a solid foreign matter or obstacle such as human neck or arm is inadvertently sandwiched between the upper margin of the windowpane and the upper window frame during upward movement of the windowpane, the upper margin of the windowpane continuously applies a compressive force to the neck or arm until the fixed time of the motor rotation expires. This is a great danger for a family including little children.

There are many proposals for overcoming this problem by using a detection means for detecting that any solid matter is sandwiched between the upper margin of the windowpane and the upper window frame during upward movement of the windowpane.

In a prior art automatic windowpane device, a motor receives an electric current having a waveform shown in FIG. 4 while it drives a windowpane. The waveform defines the current on activation of the motor at (a), during normal movement of the windowpane at (b), and on a blockage of the windowpane by a solid body at (c).

FIG. 4 shows that the current (c) on a blockage suddenly becomes much higher than the current (b) during normal movement of the windowpane. This phenomenon is used in the prior art arrangement so that a motor is deenergized when a blockage detector detects a current value exceeding a reference level, and judges that the windowpane has been blocked halfway by a solid matter in the moving path thereof. This arrangement, however, requires a means for discriminating the motor starting current (a) from the abnormal current (c) due to a blockage because the detector will otherwise erroneously acknowledge that current (a) representing a similarly great increase must be the abnormal current (c) caused by a blockage.

Instead of measuring the motor current, another prior art arrangement is adapted to monitor the motor revolution to deenergize the motor on detection of a significant decrease in the revolution due to a blockage of the windowpane.

The both aforegoing prior art arrangements are adapted to measure the absolute value of the detected material so as to acknowledge a blockage if the absolute value is out of a reference level, and stop the motor. However, the current and revolution of the motor are readily affected by various materials such as deformation of a window frame, ambient temperature, discharge voltage drop of a car battery, etc. Therefore, the reference level for judgement of existence or absence of a blockage must be considerably high in the motor current detecting arrangement and considerably low in the motor revolution detecting arrangement. These requirements prevent a sufficiently effective operation of the automatic windowpane elevator.

The present applicant already proposed a windowpane automatic elevator disclosed in a Japanese patent application No. 157298/1984 and filed July 30, 1984 which is directed to resolution of the aforegoing problems. The prior application provides an arrangement comprising a drive motor for moving a windowpane up and down, and a detector means for detecting that part of a human body or other solid matter is sandwiched between the upper margin of a windowpane and an opposed window frame during upward movement of the windowpane. The arrangement further comprises a sensor means for sequentially measuring a motor characteristic such as voltage, current, revolution, or other material of the motor; and a comparator means for comparing present and preceding values detected by the sensor means and producing a blockage detection signal when the deviation obtained by the comparison exceeds a predetermined level.

It should be noted, however, that car window frames are often deformed for some reasons, and windowpanes are not readily received in proper positions with respect to the window frames. In this case, a blockage will occur before the windowpane reaches its upper limit. This will be erroneously deemed to be a blockage by a foreign matter, and the detecting function wil be effected to invert the movement of the windowpane from upward to downward direction. This problem is not overcome by the prior application.

OBJECT OF THE INVENTION

It is therefore an object of the invention to provide a power window arrangement capable of preventing an automatic change of the windowpane movement direction when the windowpane cannot readily reach its proper upper limit due to a deformation of the window frame.

SUMMARY OF THE INVENTION

According to the invention, there is provided a power window device including a drive motor and a windowpane moved up and down by the drive motor, and adapted to detect that a foreign matter or obstacle is sandwiched between the upper margin of the windowpane and an opposed window frame during upward movement of the windowpane, an improvement of which comprises a sensor means monitoring a motor characteristic of said motor; a comparator means comparing a present value and a given time preceding value of the motor characteristic monitored by said sensor means; a detection signal output means producing a detection signal when deviation of the motor characteristic resulting from the comparison in said comparator means exceeds a predetermined value; a switching means responsive to said detection signal to invert the movement direction of said windowpane by said drive motor; and a control means activated to prohibit the inversion of the windowpane movement for a predetermined time.

DETAILED DESCRIPTION

Figure 1:
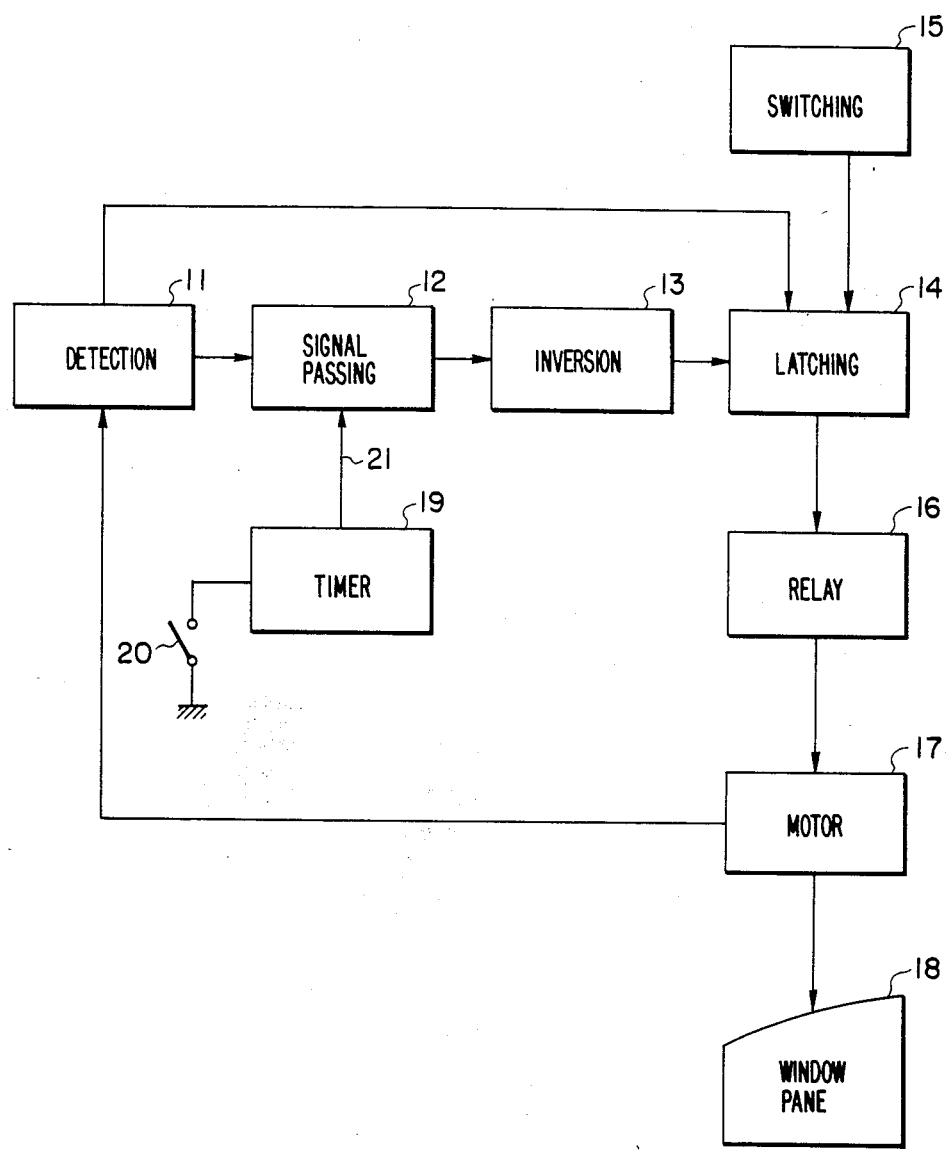
FIG. 1 is a block diagram of a power window device embodying the invention.

FIG. 1 shows an arrangement embodying the invention where a detection circuit 11 properly detects that any foreign matter such as human hand, arm or neck is sandwiched between the outer margin of a windowpane 18 and an opposed margin of a window frame (not shown) before the windowpane 18 reaches its upper limit during its upward movement.

A detection signal passing circuit 12 is responsive to detection of the detection circuit 11 to control transmission of a detection signal from the detection circuit 11.

An inversion circuit 13 is responsive to the detection signal produced by the detection circuit 11 on detection of a blockage by a human hand or other obstacle during upward movement of the windowpane 18 to release a latched condition of a latching circuit 14 and invert the rotational direction of a motor 17 so as to move the windowpane 18 downward and stop the motor 17 when the windowpane 18 reaches its lower limit.

Figure 2:
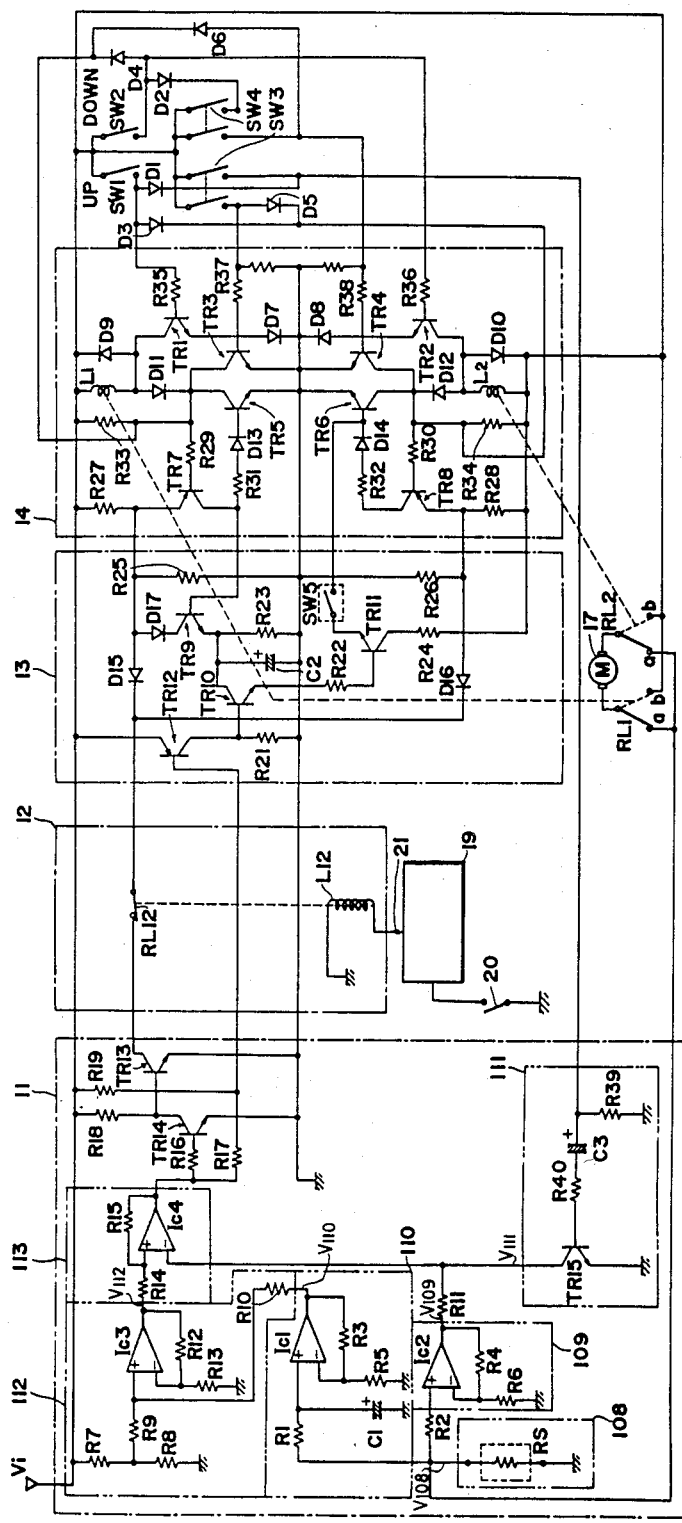
FIG. 2 is a detailed circuit diagram of the arrangement of FIG. 1.
Figure 3A:
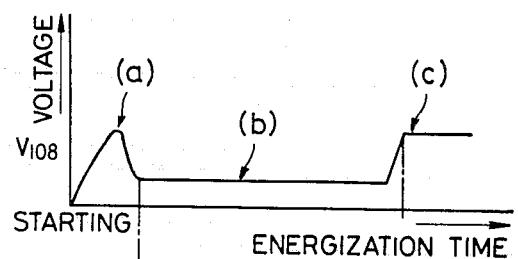
FIG. 3 shows waveforms (A) through (D) for explanation of the operation of the same arrangement.
Figure 3B:
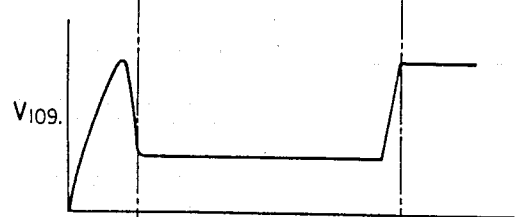
Figure 3C:
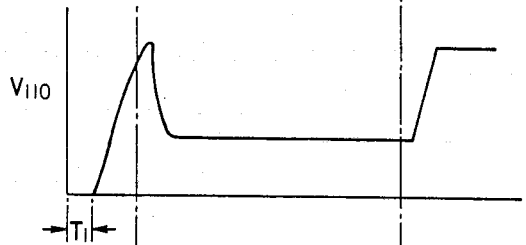
Figure 3D:
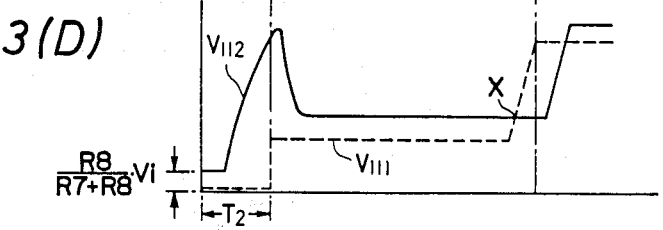
Figure 4:
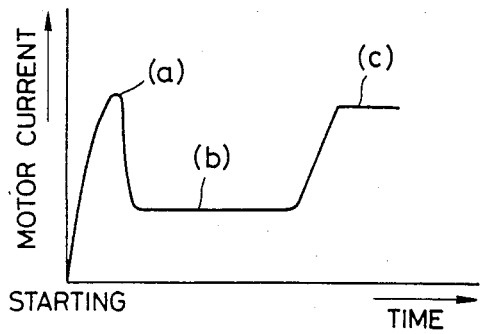
FIG. 4 shows a waveform of an electric current in an energized motor in a prior art device for explanation of a detector means thereof.

Discrimination of whether the windowpane 18 has reached its upper limit or not is effected by a position detecting switch SW5 (see FIG. 2). More specifically, when the switch SW5 is turned on, and a detection signal is entered from the detection circuit 11, the motor 17 is rotated in the opposite direction in the AND mode. On the other hand, when the switch SW5 is turned off, and a detection signal is entered from the detection circuit 11, the motor 17 is stopped in the AND mode. Therefore, the position detecting switch SW5 is preferably mounted in a movement path of the windowpane 18 or its support member.

The latching circuit 14 is adapted to maintain electrical circuit connection for energization of the motor 17 after switches SW3 and SW4 (FIG. 2) are once turned on. However, the latching circuit 14 immediately releases the circuit connection when the detection circuit 11 is activated due to the lock of the motor 17.

As shown in FIG. 2, the detection circuit 11 generally comprises a motor waveform sensor 108, real time amplifier 109, delay amplifier 110, starting voltage cancellor 111, non-invertible adder/amplifier 112 and comparator 113.

The motor waveform sensor 108 includes a resistor RS for converting the motor current to a voltage and produces an output voltage V108 having a waveform shown in FIG. 3 at (A).

The real time amplifier 109 amplifies the voltage from the resistor RS to a (1+R4/R6) multiplied value, and produces an output voltage V109 having a waveform shown in FIG. 3 at (B).

The delay amplifier 110 amplifies the voltage signal from the resistor RS to a (1+R3/R5) multiplied value with a delay time T1 determined by a capacitor C1 and a resistor R1, and produces an output voltage V110 having a waveform shown in FIG. 3 at (C).

The starting voltage cancellor 111 forcibly turns on a transistor 15 for a time T2 determined by a capacitor C3 and a resistor R39 at the moment where the switch SW3 is turned on, and cancels the voltage at the starting of the motor activation. The cancellor 111 produces an output voltage V111 having a waveform lacking a part of the output throughout the time T2 from the starting.

The non-invertible adder/amplifier 112 produces an output V112 which is the sum of he output voltage from the delay amplifier 110 and a voltage value determined by $\{R8/(R7+R8)\} \cdot V_i$. The output V112 has a waveform shown in FIG. 3 at (D).

The comparator 113 compares the output voltage V111 from the starting voltage cancellor 111 with the output voltage V112 from the non-invertible adder/amplifier 112 to judge whether the motor 17 has been locked or not due to a blockage of the windowpane 18 by an obstacle.

More specifically, the non-invertible adder/amplifier 112 previously adds a voltage $\{R8/(R7+R8)\} \cdot V_i$ to the T1 delayed voltage waveform of the motor given by the delay amplifier 110, and enters the resulting voltage in the non-invertible input terminal of the comparator 113. The invertible input terminal of the comparator 113 receives a voltage supplied from the transistor TR15 after removing a part of the original voltage V of the motor 17 for the time T2 from the starting thereof. For a better understanding, FIG. 3 (D) shows the waveforms of both voltages V112 and V111 in an overlapping fashion.

Therefore, the comparator 113 compares the present motor voltage to the T1 preceding motor voltage (which includes an addition of $\{R8/(R7+R8)\} \cdot V_i$). If the present motor voltage is lower than the preceding motor voltage, the output of the comparator 113 maintains its "high" level, but it is inverted from the "high" level to the "low" level when the present voltage becomes higher than the preceding voltage. Thereby it is deemed that the motor 17 has been locked.

A timer 19 counts up a predetermined time (five seconds, for example) in response to closure of an opening and closing switch 20 which is normally opened, and produces control signal 21 for invalidating the detection signal passing circuit 12 throughout the counting time.

A relay 16 shown in FIG. 1 includes relay coils L1 and L2 shown in FIG. 2 and relay switches RL1 and RL2 interlocked to the relay coils.

While no current is entered in the relay coil L1 (or L2), the relay switch RL1 (or RL2) is positioned at a contact (a) (shown in FIG. 1). When the relay coil L1 (or L2) is energized, the switch RL1 (or RL2) is brought to a contact (b) due to the electromagnetism of the relay coil.

Forward rotation of the drive motor 17 for upward movement of the windowpane 18 is established when the relay switch RL1 is at the contact (b) and the relay switch RL2 is at the contact (a). Reverse rotation of the drive motor 17 for downward movement of the windowpane 18 is established when the relay switch RL1 is at the contact (a) and the relay switch RL2 is at the contact (b).

Up and down movement of the windowpane 18 is hereinbelow explained, dividing it into four modes, i.e. (i) automatic upward drive, (ii) manual upward drive, (iii) automatic downward drive and (iv) manual downward drive.

Assume here that the switch 20 is maintained at its off position (opened) in normal operation of the device, and the timer 19 is not activated accordingly. In this connection, the following explanation is made on the assumption that the relay coil L12 of the detection signal passing circuit 12 is not energized, and the relay switch RL12 is at its on position (closed).

(i) Automatic Upward Drive:

When the switch SW3 is turned on, conduction of the transistor TR3 is established, with a base current applied thereto via the resistor R37, and the relay coil L1 is energized through a route of relay coil L1→diode D11→ transistor TR3. Accordingly, the relay switch RL1 is changed from contact (a) to (b). Since the contact of the relay switch RL2 is maintained at (a), the drive motor 17 receives a current and rotates in the forward direction to elevate the windowpane 18.

Concurrently, the transistor TR7 receives a base current via the transistor TR3, and the collector current thereof flows in the base of the transistor TR5 to maintain energization of the relay coil L1. Therefore, the motor 17 continues its forward rotation and continuously elevates the windowpane 18 also after the switch SW is turned off.

If the motor 17 is locked due to a foreign matter or obstacle sandwiched between the windowpane 18 and the window frame, the detector circuit 11 is activated, and the output of the comparator IC4 is inverted to the "low" level, and establishes conduction of the transistor TR13. Accordingly, a blockage detection signal is generated, and the collector potential of the transistor TR13 is responsively changed from "high" to "low" level. This makes the diode 15 conductive, and decreases the emitter potential of the transistor TR7 near the ground potential value. Therefore, the transistor TR5 becomes non-conductive. Since the transistor TR5 is responsively turned off, the relay coil L1 is deenergized, and the forward rotation of the motor 17 is stopped.

At that time, if the position detecting switch SW5 is closed, the charge stored in the capacitor C2 is discharged through a path of transistor TR10→resistor R22→transistor TR11→position detecting switch SW5→transistor TR6. Therefore, the transistor TR6 is turned on and transmits the current to the relay coil L2 to change the contact of the relay switch RL2 from (a) to (b). Accordingly, the motor 17 rotates in the opposite direction to drive the windowpane 18 downward. concurrently, the transistor TR8 is supplied with the base current, and its collector current flows in the base of the transistor TR6 to maintain conduction of the transistor TR6. Therefore, energization of the relay coil L2 is maintained, and the windowpane 18 is continuously driven downward.

When the windowpane 18 cannot reach a desired position due to deformation of the window frame or other reason, the detector circuit 12 erroneously judges it to be a blockage by a foreign matter or obstacle, and changes the circuit connection from automatic upward drive mode to automatic downward drive mode. Therefore, the windowpane 18 is never closed.

In this case, however, a user may manually activate the safety free switch 20. Thereby, the timer 19 is activated and produces a control signal 21 to energize the relay coil L12, so that the electromagnetism thereof forcibly turns off the relay switch RL12. The off position of the relay switch RL12 is maintained throughout a predetermined time (about five seconds) of the counting action of the timer 19, and thereafter changed to its on position.

More specifically, while the timer 19 counts up the time, a blockage signal produced by the detector circuit 11 is never transmitted to the inversion circuit 13, so as to allow the motor 17 to continuously drive the windowpane 18 upward for the time before the inversion circuit 13 changes its rotating direction. Therefore, the windowpane 18 can be elevated to a desired position with respect to the deformed window frame.

(ii) Manual Upward Drive:

When a switch SW1 for manual upward drive is turned on, the transistor TR1 receives the base current via the resistor 35. In response to conduction of the transistor TR1, the relay coil L1 is energized through a path of relay coil L1→transistor TR1→diode D7, and the motor 17 rotates in the forward direction to elevate the windowpane 18. When the switch SW1 is turned off, the relay coil L1 is denergized, and the rotation of the motor 17 and the upward movement of the windowpane 18 are stopped.

(iii) Automatic Downward Drive:

When a switch SW4 for automatic downward drive, the transistor TR4 receives the base current via the resistor R38. In response to conduction of the transistor TR4, the relay coil L2 is energized through a path of relay coil L2→diode 12→transistor TR4, and the motor 17 rotates in the opposite direction to drive the windowpane 18 downward.

Concurrently, the transistor TR8 receives the base current via the transistor TR4, and its collector current flows in the base of the transistor TR6. Due to conduction of the transistor TR6, energization of the relay coil L2 is maintained. After this, the reverse rotation of the motor 17 is maintained to continuously drive the windowpane 18 downward regardless of return of the switch SW4 to its off position.

If the motor 17 is locked during downward movement of the windowpane 18, the detector circuit 11 is activated, and the output of the comparator IC4 is inverted to the "low" level to establish conduction of the transistor TR13. Accordingly, the collector potential of the transistor TR13 is changed from "high" to "low" level. This makes the diode D16 conductive, and decreases the emitter potential of the transistor TR8 near the ground potential value, the transistor TR8 is turned off. Accordingly, the transistor TR6 is also turned off, and the relay coil L2 is deenergized to stop the motor 17.

(iv) Manual Downward Drive:

When a switch SW2 for manual downward drive, the transistor TR2 receives the base current via the resistor R36. Due to conduction of the transistor TR2, the relay coil L2 is energized through a path of relay coil L2→transistor TR2→diode D8, and the motor 17 rotates in the reverse direction to drive the windowpane 18 downward. When the switch SW2 is turned off, the relay coil L2 loses the current, and the downward movement of the windowpane 18 is terminated.

The described embodiment includes the circuit provided between the detector circuit 11 and the inversion circuit 12 to block signal transmission therethrough. However, the invention is not limited to this embodiment, but may be arranged so that the timer 19 continuously produces signals for a predetermined time and applies them to the detector circuit 11 or inversion circuit 13 to maintain these circuits inoperative throughout the time.

Although the described embodiment is arranged to measure the motor current to monitor the condition of the motor, the invention is not limited to this, but may be arranged to monitor the motor current or revolution to detect a motor blockage.

Although the described embodiment employs the detection means having an analog circuit arrangement, the invention is not limited to this, but may employ a microcomputer to detect a motor blockage and control up and down movement of the windowpane.

As described, the invention arrangement never fails to move the windowpane to a desired position by temporarily inactivating its automatic direction inverting arrangement when upward movement of the windowpane is prevented by some reason before it reaches its upper limit.

The embodiments of the invention in which an exclusive property or privilege is claimed are defined as follows.

1. In a power window device including a drive motor and a window pane moved up and down by the drive motor, and adapted to detect that a foreign matter or obstacle is sandwiched between the upper margin of the windowpane and an opposed window frame during upward movement of the windowpane, an improvement comprising: a sensor means monitoring a motor characteristic of said motor; a comparator means comparing a present value and a given time preceding value of the motor characteristic monitored by said sensor means; a detection signal output means producing a detection signal when deviation of the motor characteristic resulting from the comparison in said comparator means exceeds a predetermined value; a switching means responsive to said detection signal to invert the movement direction of said windowpane by said drive motor; and a control means activated to prohibit the inversion of the windowpane movement for a predetermined time.

2. A power window device of claim 1 wherein said control means inhibits application of said detection signal to said switching means.

3. A power window device of claim 1 wherein said control means invalidates detecting operation of said detection signal output means for said predetermined time.

4. A power window device of claim 1 wherein said control means invalidates operation of said switching means for said predetermined time.

5. A power window device of claim 1, wherein said predetermined time by said control means corresponds to a time counted by a timer.

6. A power window device of claim 2 wherein said predetermined time by said control means corresponds to a time counted by a timer.

7. A power window device of claim 3 wherein said predetermined time by said control means corresponds to a time counted by a timer.

8. A power window device of claim 4 wherein said predetermined time by said control means corresponds to a time counted by a timer.

* * * * *